(12) United States Patent
Ryskoski

(10) Patent No.: US 7,197,370 B1
(45) Date of Patent: Mar. 27, 2007

(54) METHOD AND APPARATUS FOR DYNAMIC ADJUSTMENT OF AN ACTIVE SENSOR LIST

(75) Inventor: Matthew S. Ryskoski, Kyle, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 318 days.

(21) Appl. No.: 10/958,816

(22) Filed: Oct. 5, 2004

(51) Int. Cl.
G06F 19/00 (2006.01)
G06F 17/00 (2006.01)
G21C 17/00 (2006.01)

(52) U.S. Cl. ............ 700/108; 700/121; 702/182; 715/700; 715/783; 715/965

(58) Field of Classification Search ........ 700/108–111, 700/121; 702/182, 188; 715/700, 739, 783, 715/810, 814, 825, 828, 855, 965
See application file for complete search history.

(56) References Cited

U.S. PATENT DOCUMENTS 6,618,745 B2 * 9/2003 Christensen et al. ........ 709/201
2005/0047645 A1 * 3/2005 Funk et al. ................. 382/145

* cited by examiner

Primary Examiner—Leo Picard
Assistant Examiner—Sean Shechtman
(74) Attorney, Agent, or Firm—Williams, Morgan & Amerson

(57) ABSTRACT

The present invention provides a method and apparatus for dynamic adjustment of an active sensor list. The method includes providing an active sensor list indicative of at least one sensor associated with at least one processing tool, the at least one sensor being communicatively coupled to a network having an associated bandwidth, receiving information indicative of a state of at least one of the processing tools, and modifying the active sensor list based on the information indicative of the state of the at least one of the processing tools and the associated network bandwidth.

30 Claims, 4 Drawing Sheets

| SENSOR IDENTIFICATION | PRIORITY | ACTIVE? |
|---|---|---|
| SENSOR 215(1) | 10 | YES |
| SENSOR 215(2) | 8 | YES |
| ⋮ | | |
| SENSOR 215(n) | 2 | NO |

Figure 3A

| SENSOR IDENTIFICATION | PRIORITY | ACTIVE? |
|---|---|---|
| SENSOR 215(1) | 10 | YES |
| SENSOR 215(2) | 8 | NO |
| ⋮ | | |
| SENSOR 215(n) | 2 | NO |

Figure 3B

| SENSOR IDENTIFICATION | PRIORITY | ACTIVE? |
|---|---|---|
| SENSOR 215(1) | 10 | YES |
| SENSOR 215(2) | 8 | YES |
| ⋮ | | |
| SENSOR 215(n) | 2 | YES |

Figure 3C

METHOD AND APPARATUS FOR DYNAMIC ADJUSTMENT OF AN ACTIVE SENSOR LIST

BACKGROUND OF THE INVENTION

1. Field of the Invention

This invention relates generally to the field of semiconductor device manufacturing and, more particularly, to a method and apparatus for dynamic adjustment of an active sensor list.

2. Description of the Related Art

To fabricate a semiconductor device, a wafer is typically processed through numerous processing tools in a predetermined sequence. The processing tools may include photolithography steppers, etch tools, deposition tools, polishing tools, rapid thermal anneal tools, ion implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. The tool sequence, as well as the recipes used by the tools, must be carefully controlled so that the features formed on the wafer meet appropriate design and performance criteria. Thus, advanced process control (APC) systems are often used to coordinate operation of the processing tools.

A conventional APC system includes one or more machine interfaces that are communicatively coupled to equipment interfaces associated with each of the processing tools. The machine and equipment interfaces are typically computers or workstations that are coupled to a network. For example, a plurality of processing tools may be coupled to an Intranet via an associated plurality of equipment interfaces. A machine interface that implements the conventional APC system may also be coupled to the Intranet. In operation, the conventional APC system initiates a control script based upon a manufacturing model, which can be a software program that automatically retrieves the data needed to execute a manufacturing process, and transmits one or more control messages, such as the operating recipe, to the processing tools.

The processing tools may include one or more sensors to collect data associated with operation of the processing tool. For example, an etching tool may include a sensor to monitor the radio frequency (RF) power delivered by the etching tool. For another example, a rapid thermal anneal tool may include a thermocouple to monitor a temperature within the tool. The data acquired by the various sensors is often referred to as trace data. The collected tool trace data may then be provided to the APC system, which may use the collected tool trace data for various purposes such as fault detection and/or classification. For example, the tool trace data collected from the thermocouple in the rapid thermal anneal tool may indicate that the temperature within the tool has dropped below a desired threshold, indicating a possible fault.

The network that is used to transmit control messages, tool trace data, and any other information between the APC system and the processing tools has a finite bandwidth. Consequently, it is not generally possible to continuously collect and transmit tool trace data using all the sensors in all the processing tools coupled to the network. For example, an exemplary APC system may be coupled to several processing tools, each of which may have as many as 50 or 60 associated sensors. If all of the sensors continuously attempted to provide tool trace data over the network, the network would become overloaded and unable to transmit the collected tool trace data. Accordingly, the APC system provides a predetermined data collection plan including an active sensor list that specifies which sensors may collect tool trace data. For example, the active sensor list may include all the sensors in a subset of the processing tools, none of the sensors in a subset of the processing tools, or subset of the sensors in one or more processing tools.

The predetermined active sensor list may reduce the bandwidth efficiency of the network. For example, the active sensor list may indicate that tool trace data should be collected from sensors associated with a set of processing tools because these processing tools will be used to process a wafer during a processing run. One or more of the processing tools may become idle during the processing run, e.g. when no wafer is present in the one or more processing tools. However, the sensors associated with the idle processing tools will continue to collect data and provide tool trace data via the network, as instructed by the predetermined active sensor list. Thus, a portion of the bandwidth of the network will be allocated to sensors and/or tools that are not providing useful tool trace data. Moreover, if too many sensors are included in the active sensor list, tool trace data may be dropped.

The predetermined active sensor list may also limit the ability of the APC system to detect and/or classify faults or other unexpected events associated with the processing tools. For example, tool trace data from a sensor may deviate from an expected value, which may indicate a fault associated with the tool. Thus, it may be desirable to add additional sensors associated with the tool to the active sensor list to provide additional data that may assist in detecting and/or classifying the suspected fault. Moreover, it may also be desirable to remove one or more sensors from the active sensor list to provide additional network bandwidth for the high sampling rate sensor(s). However, conventional APC systems are not able to modify the predetermined data collection plans to respond to changing conditions and/or bandwidths.

The present invention is directed to addressing the effects of one or more of the problems set forth above.

SUMMARY OF THE INVENTION

In one embodiment of the present invention, a method is provided for dynamic adjustment of an active sensor list. The method includes providing an active sensor list indicative of at least one sensor associated with at least one processing tool, the at least one sensor being communicatively coupled to a network having an associated bandwidth, receiving information indicative of a state of at least one of the processing tools, and modifying the active sensor list based on the information indicative of the state of the at least one of the processing tools and the associated network bandwidth. Embodiments manufacturing systems capable of dynamic adjustment of an active sensor list are also provided.

BRIEF DESCRIPTION OF THE DRAWINGS

The invention may be understood by reference to the following description taken in conjunction with the accompanying drawings, in which like reference numerals identify like elements, and in which:

FIGS. 3A, 3B, and 3C conceptually illustrate active sensor lists, in accordance with the present invention.

Figure 1:
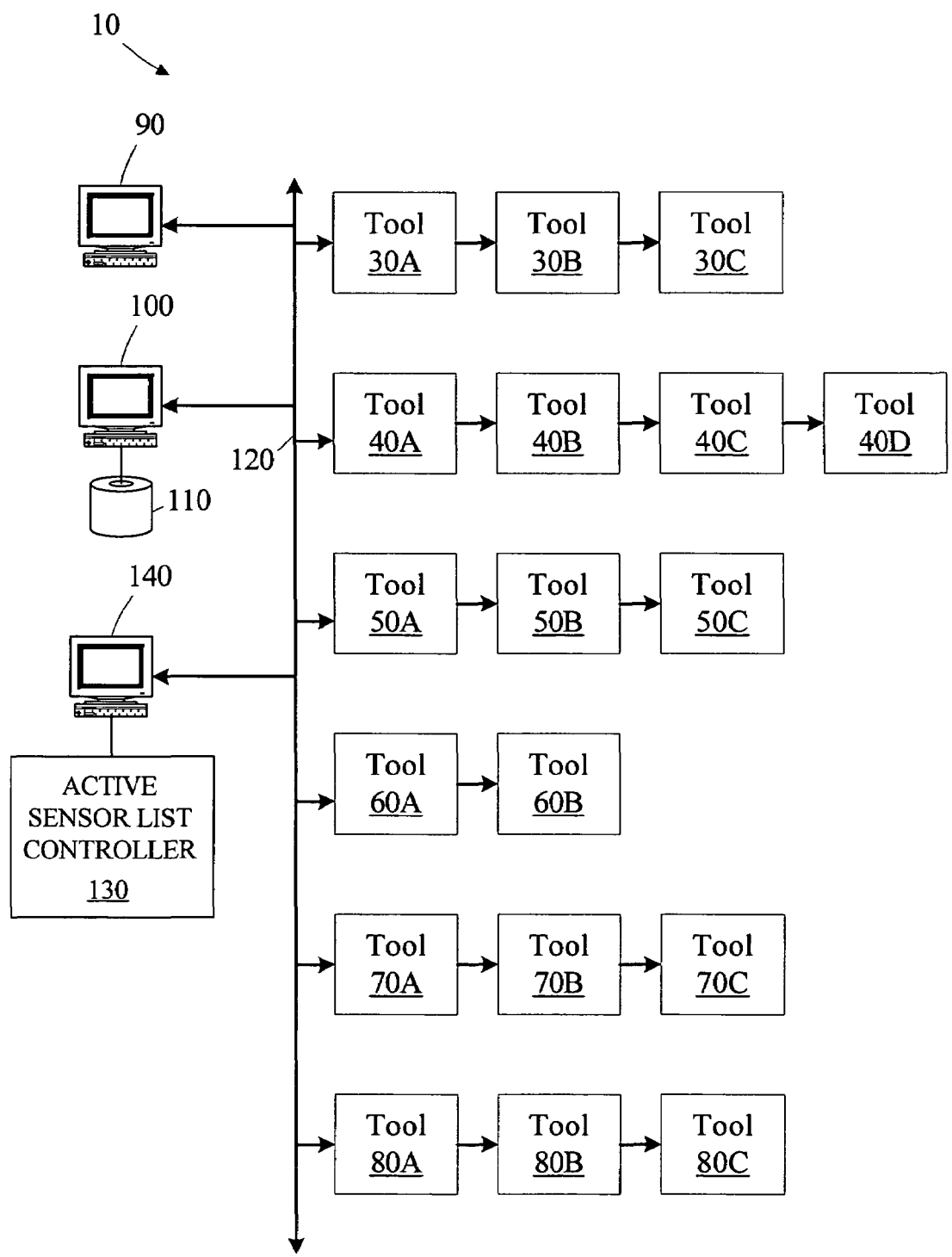
FIG. 1 is a simplified block diagram of a manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 shows a simplified block diagram of an illustrative manufacturing system 10. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other similar devices. The techniques may also be applied to workpieces or manufactured items other than semiconductor devices.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif. However, persons of ordinary skill in the art should appreciate that the present invention is not limited to the Catalyst APC system. In alternative embodiments, any desirable information exchange and process control framework may be used without departing from the scope of the present invention.

The manufacturing system 10 includes a plurality of tools 30–80. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include metrology tools, photolithography steppers, etch tools, deposition tools, polishing tools, rapid thermal anneal tools, implantation tools, and the like The tools 30–80 are depicted in a rank and file grouping for illustrative purposes only. In an actual implementation, the tools 30–80 may be arranged in any physical order or grouping. As will be discussed in detail below, each tool 30–80 may also include one or more sensors (not shown in FIG. 1).

A manufacturing execution system (MES) server 90 directs high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, and the like. The processing and data storage functions are distributed amongst the different computers or workstations in FIG. 1 to provide general independence and central information storage. However, persons of ordinary skill in the art should appreciate that different numbers of computers and different arrangements may be used without departing from the scope of the instant invention.

A network 120 interconnects various components of the manufacturing system 10, such as the tools 30–80 and the servers 90, 100, allowing them to exchange information. In one embodiment, each of the tools 30–80 is coupled to a computer (not shown) for interfacing with the network 120. The connections between the tools 30–80 in a particular grouping are meant to represent connections to the network 120, rather than interconnections between the tools 30–80. In various alternative embodiments, the network 120 may be an Internet, intranet, or any other desirable type of network. Persons of ordinary skill in the art should appreciate that the network 120 may include a variety of routers, hubs, switches, connectors, interfaces, ports, cables, wires, and the like that are not shown in FIG. 1.

The network 120 has an associated bandwidth for data transmission. For example, the network 120 may be able to transmit several hundred megabits of data per second between the tool 30A and the server 90. However, persons of ordinary skill in the art should appreciate that the bandwidth of the network 120 may not be characterized by a single bandwidth and instead may vary depending on various factors such as the data path that connects components of the network 120. For example, the bandwidth for data transmitted between the tool 30A and the server 90 may be different than the bandwidth for data transmitted between the tool 80A and the server 100. Moreover, although the overall bandwidth of the network 120 may remain approximately constant, the bandwidth available for any particular device coupled to the network 120 may vary depending on factors such as how much data is being transmitted over the network 120 by other devices. For example, if the tool 30A is transmitting a large volume of data to the server 90, the bandwidth available for data transmissions between the tool 80A and the server 100 may be reduced.

An active sensor list controller 130 is coupled to the network 120. In the illustrated embodiment, the active sensor list controller 130 is implemented in a computer 140, which may be coupled to the network 120 in any desirable manner. The active sensor list controller 130 can form at least a portion of one or more data collection plans and provide the portion of the data collection plans to the tools 30–80. For example, as will be discussed in more detail below, the active sensor list controller 130 can form an active sensor list that indicates which sensors may be used to acquire tool trace data associated with the tools 30–80. The active sensor list may be included in the data collection plan. However, in alternative embodiments, the active sensor list may not be included in the data collection plan.

The active sensor list controller 130 determines and/or monitors the bandwidth associated with the network 120. In one embodiment, a predetermined estimate of the bandwidth associated with the network 120 may be provided to the active sensor list controller 130. For example, the bandwidth may be constrained to a level below a predetermined inherent limit of the manufacturing system 10 to avoid communications issues that may stem from unduly taxing the communications lines or other devices in the network 120. Alternatively, the active sensor list controller 130 may estimate the bandwidth associate with the network 120 using data received from the network 120.

An allocation of the bandwidth associated with the network 120 may also be determined by the active sensor list controller 130. In one embodiment, the active sensor list controller 130 may receive information indicative of the allocation of the available bandwidth associated with the network 120. For example, the active sensor list controller 130 may receive information indicating that approximately 75% of the available bandwidth is allocated to the tools 30–80 and approximately 25% of the available bandwidth is not allocated. Alternatively, the active sensor list controller 130 may determine the allocation of the bandwidth associated with the network 120, at least in part based upon the active sensor list. For example, the active sensor list controller 130 may determine the allocation of the bandwidth based upon an expected data transmission rate associated with each of the active sensors in the active sensor list.

The active sensor list controller 130 is configured to receive information indicative of a state of each of the tools 30–80. For example, the information may indicate that one or more of the tools 30–80 is actively processing a wafer and may also include fabrication work-in-progress (WIP) levels associated with one or more of the active tools 30–80. For another example, the active sensor list controller 130 may receive information indicating that one or more of the tools 30–80 is idle. In one embodiment, the information indicative of a state of each of the tools 30–80 may include the tool trace data provided by the tools 30–80. For example, the active sensor list controller 130 may analyze the tool trace data to detect and/or classify potential faults or other unexpected events associated with the tools 30–80.

Figure 2:
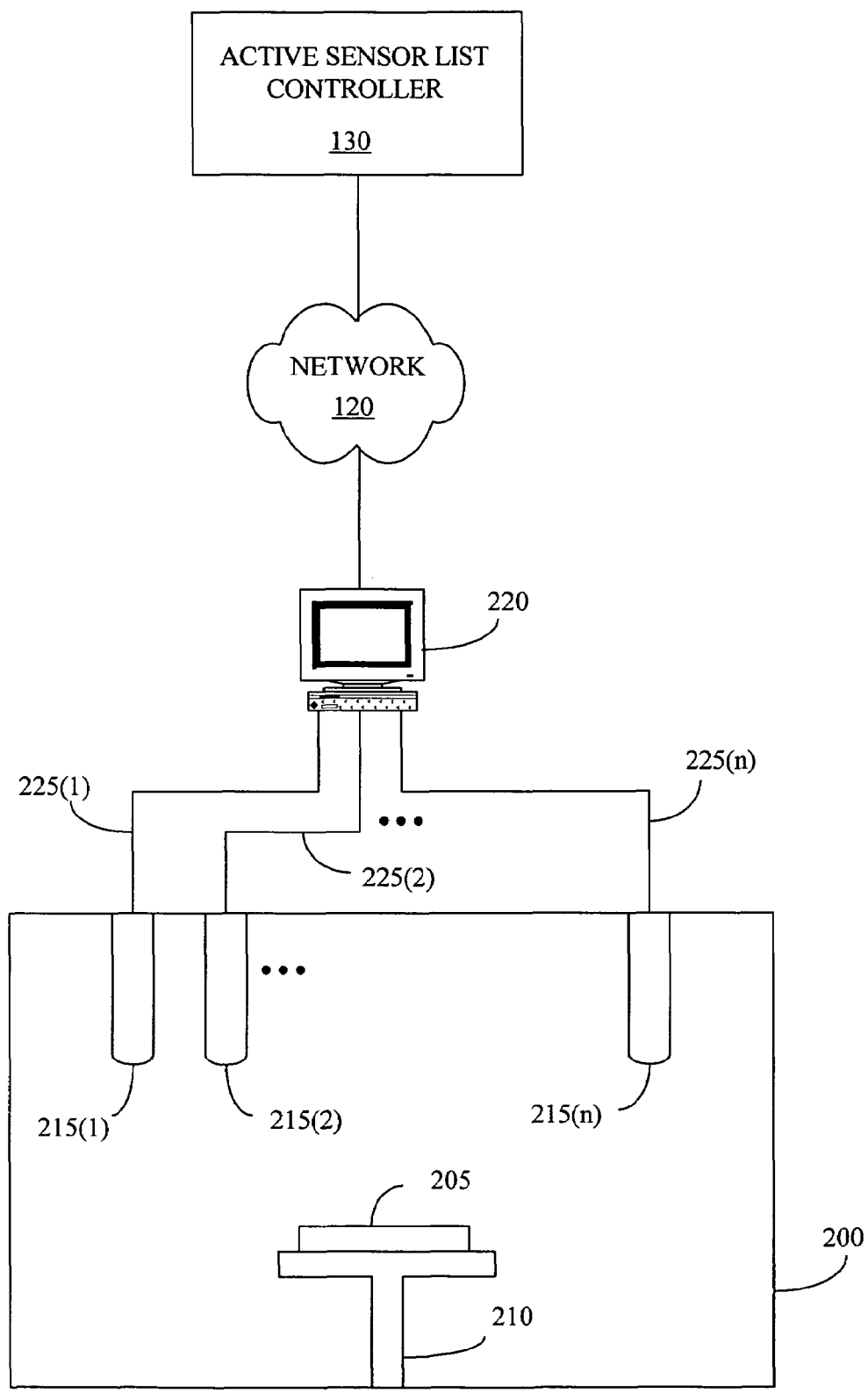
FIG. 2 conceptually illustrates an exemplary embodiment of a processing tool, in accordance with the present invention.

FIG. 2 conceptually illustrates an exemplary embodiment of a processing tool 200 that is communicatively coupled to the active list controller 130 via the network 120. In the illustrated embodiment, the processing tool 200 includes a wafer 205 disposed upon a platform 210. Persons of ordinary skill in the art should appreciate that the processing tool 200 may include other components not shown in FIG. 2. In the interest of clarity, only those components of the processing tool 200 that are relevant to the present invention will be discussed herein.

The processing tool 200 includes a plurality of sensors 215(1–n). The present invention is not limited to any particular type of sensor 215(1–n). In various alternative embodiments, the sensors 215(1–n) may be any desirable type of sensor or any desirable combination of types of sensors. For example, the sensors 215(1–n) may include thermocouples, pressure sensors, gas flow sensors, radiation sensors, acoustic sensors, and the like. Moreover, the present invention is not limited to any particular number of sensors 215(1–n). In alternative embodiments, the processing tool 200 may include more or fewer sensors 215(1–n) than are shown in FIG. 2. For example, the processing tool 200 may include about 50 sensors 215(1–n). The sensors 215(1–n) may be integral to the processing tool 200 or they may be add-ons.

The sensors 215(1–n) are coupled to an equipment interface 220, such as a computer, by one or more interfaces 225(1–n). Persons of ordinary skill in the art should appreciate that the one or more interfaces 225(1–n) may include components that are not shown in FIG. 2 such as processing units, data communication ports, routers, switches, hubs, cables, wires, connectors, and the like. The equipment interface 220 may be coupled to the network 120 in any desirable manner. As used herein, the bandwidth associated with the network 120 will be understood to include the bandwidth of the network 120, the equipment interface 220, the interfaces 225(1–n), and/or any other component that may affect the bandwidth available to one or more of the sensors 215(1–n) for transmitting or receiving data over the network 120.

In operation, the active sensor list controller 130 forms and provides an active sensor list to the equipment interface 220. For example, the active sensor list controller 130 may form an active sensor list indicating that the sensors 215 (1–2) are to collect data and provide tool trace data. In one embodiment, the active sensor list may be provided as a portion of a data collection plan formed by the active sensor list controller 130. However, persons of ordinary skill in the art should shade that the active sensor list may not necessarily be included in the data collection plan and that the data collection plan may be, at least in part, formed by other components.

FIG. 3A conceptually illustrates an exemplary embodiment of an active sensor list 300 that may be formed by the active sensor list controller 130 shown in FIG. 2. In the illustrated embodiment, the active sensor list 300 includes a sensor identification field 305, a priority field 310, and an active field 315. However, persons of ordinary skill in the art should appreciate that more or fewer fields may be included in the active sensor list 300. For example, a preference field (not shown) indicative of a preference associated with each sensor may be included in some embodiments of the active sensor list 300. Furthermore, although the sensors 215(1–n) are all associated with the processing tool 200 shown in FIG. 2, the present invention is not so limited. In alternative embodiments, sensors associated with other processing tools may also be included in the active sensor list 300.

The sensor identification field 305 includes information indicative of sensors in the active sensor list 300. In the interest of clarity, the sensor identification field 305 shown in FIG. 3A includes information that identifies the sensors by the reference numbers used in FIG. 2. However, persons of ordinary skill in the art should appreciate that, in alternative embodiments, other identifying information may be used in the sensor identification field 305, either in addition to or in place of the aforementioned reference numbers. For example, a sensor name or sensor type (e.g. thermocouple, pressure sensor, and the like) in the form of a text string may be used. For another example, a serial number or other identifying number associated with the sensors may be used in the sensor identification field 305.

The priority field 310 includes information indicative of a priority level associated with each of the sensors 215(1–n). In the illustrated embodiment, the priority field 310 includes a number indicative of a priority level between 1 and 10, with higher numbers indicating higher levels of priority. However, in alternative embodiments, other indicators of the priority level may be used. For example, the priority level may be indicated by strings such as "high," "low," and "medium," or other numerical ranges. Moreover, the priority field 310 is an optional field that may not be included in all embodiments of the active sensor list 300.

The active field 315 includes information indicating whether or not the associated sensor 215(1–n) is an active sensor. In FIG. 3A, the information and the active field 315 indicates that the sensors 215(1–2) are currently active sensors and the sensor 215(n) is not an active sensor. However, the active field 315 is an optional field and may not be included in all embodiments of the active sensor list. For example, the active sensor list 300 may be a variable length list that only includes those sensors that are currently active.

Referring back to FIG. 2, the equipment interface 220 may provide a signal indicative of the active sensor list to the sensors 215(1–n). For example, the equipment interface 225 may provide signals that may be used to activate and/or initiate data collection by the active sensors, e.g. the sensors 215(1–2). Alternatively, all of the sensors 215(1–n) may collect data substantially continuously or at a predetermined sample rate, but the equipment interface 220 may only receive, store, and/or transmit data from the sensors 215 (1–n) indicated in the active sensor list. The collected and/or stored data from the active sensors may be used to form tool trace data which may be provided to the network 120 for eventual analysis and/or transmission to other devices.

In operation, the active sensor list controller 130 may modify the active sensor list based on the information indicative of the state of the processing tool 200 and the bandwidth associated with the network 120. In one embodiment, the active sensor list controller 130 may add one or more sensors 215(1–n) to the active sensor list, e.g. to acquire additional data from the processing tool 200. In another embodiment, which may be practiced in addition to the previous embodiment or alternatively to the previous embodiment, the active sensor list controller 130 may remove one or more sensors 215(1–n) from the active sensor list, e.g. to reduce the network bandwidth allocated to the sensors 215(1–n).

FIG. 3B conceptually illustrates an exemplary embodiment of a modified active sensor list 320. In the illustrated embodiment, the sensor 215(2) has been removed from the active sensor list 320, as indicated by the string "No" in the active field 325. Alternatively, the entry corresponding to the sensor 215(2) may be removed from a variable length active sensor list 320 to indicate that the sensor 215(2) in no longer active. In one embodiment, the sensor 215(2) may be removed from the active sensor list 320 based in part on information contained in the priority field 330. For example, sensors having a priority less than or equal to "8" may be removed from the active sensor list 320.

FIG. 3C conceptually illustrates an exemplary embodiment of a modified active sensor list 340. In the illustrated embodiment, the sensor 215(n) has been added to the active sensor list 340, as indicated by the string "Yes" in the active field 345. Alternatively, the entry corresponding to the sensor 215(n) may be added a variable length active sensor list 340 to indicate that the sensor 215(n) is active. In one embodiment, the sensor 215(n) may be added to the active sensor list 340 based in part on information contained in the priority field 350. For example, sensors having a priority greater than or equal to "2" may be added to the active sensor list 320.

In some embodiments, which may be practiced in addition to the aforementioned embodiments or alternatively to these embodiments, the active sensor list controller 130 may modify the active sensor list based in part on the tool trace data. For example, the active sensor list controller 130 may analyze the tool trace data to determine whether or not one or more faults or unexpected events have taken place. For example, the temperature in a deposition tool may be controlled to within a preset tolerance of a nominal temperature in order to control a thickness of a deposited layer. The deposition tool may also include a temperature sensor, such as a thermocouple, and a power sensor to monitor the power provided to a heating element in the deposition tool. An unusual level of noise and/or one or more transients in the tool trace data provided by the thermocouple may indicate a process and/or device fault. Thus, it may be desirable to activate the power sensor to gather additional data to determine whether or not a process or device fault occurred.

Figure 4:
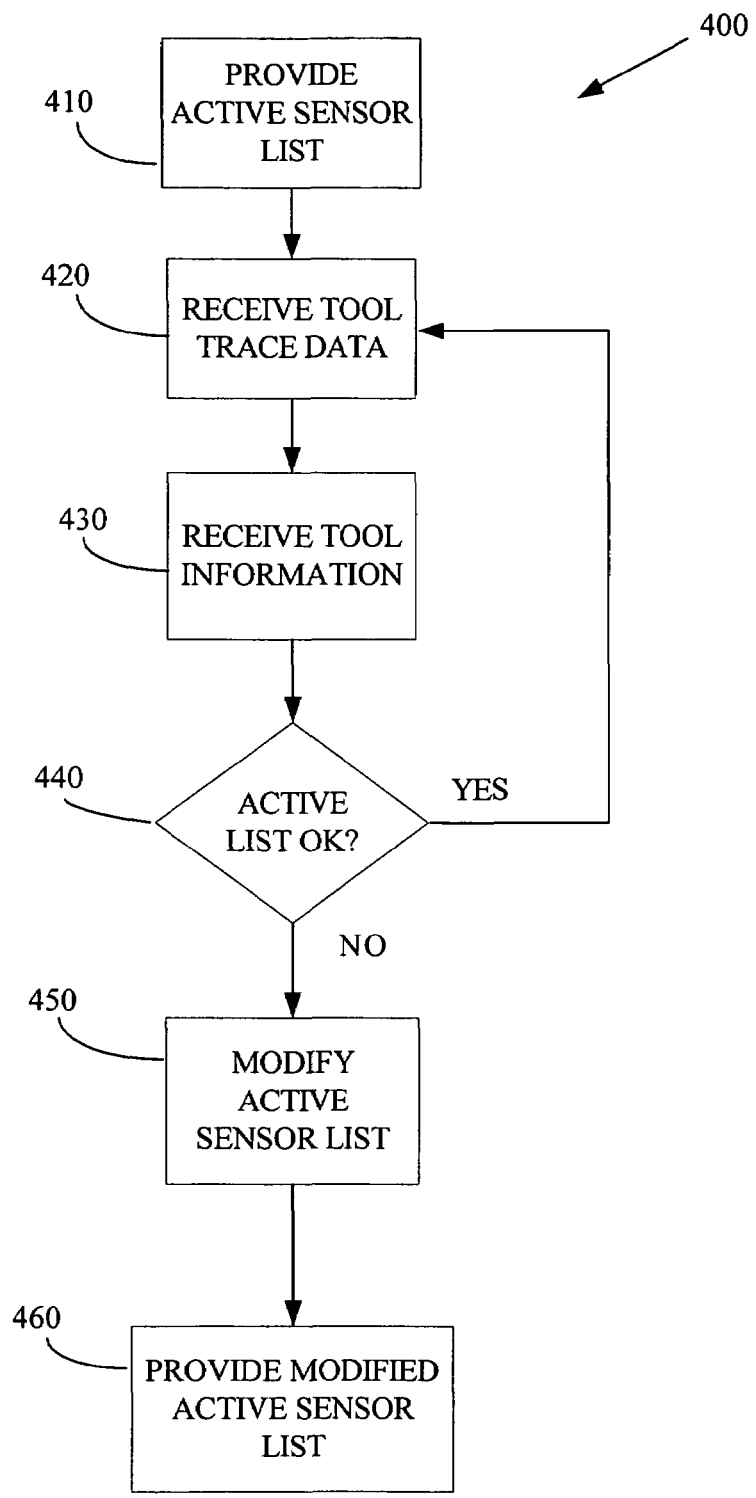
FIG. 4 conceptually illustrates a method of dynamically adjusting an active sensor list that may be used in the manufacturing system shown in FIG. 1, in accordance with the present invention.

FIG. 4 conceptually illustrates a method 400 of dynamically adjusting an active sensor list that may be used in the manufacturing system 10 shown in FIG. 1. In the illustrated embodiment, a controller, such as the active sensor list controller 130 shown in FIG. 1, provides (at 410) an active sensor list indicative of one or more active sensors associated with one or more processing tools. For example, the controller may provide (at 410) the active sensor list to an equipment interface associated with one or more processing tools having one or more sensors. The one or more sensors indicated as active in the active sensor list may then collect data and provide tool trace data, which is received (at 420) by the controller.

Information indicative of one or more states of one or more of the processing tools is received (at 430) by the controller. For example, information indicating that one or more of the processing tools are actively processing a wafer may be received (at 430) by the controller. The received (at 430) information may also include fabrication work-in-progress (WIP) levels associated with one or more of the active processing tools, information indicating that one or more of the processing tools are idle, information indicating a possible fault or other unexpected events, information indicative of a sensor priority and/or preference, and the like. In various alternative embodiments, the information indicative of one or more states of one or more of the processing tools may be received (at 430) substantially continuously, periodically, or at any other desired interval.

The controller may then decide (at 440) whether or not it is desirable to modify the active sensor list. If the controller decides (at 430) that it is not desirable to modify the active sensor list, as discussed above, then additional tool trace data and/or information indicative of the state of one or more of the processing tools may be received (at 420 and 430). On the other hand, if the controller decides (at 440) that it is desirable to modify the active sensor list, then the controller may modify (at 450) the active sensor list. In one embodiment, the controller may determine the allocation of network bandwidth based on the active sensor list and/or the information indicative of the state of the at least one of the processing tools. For example, the controller may determine that one or more of the active sensors are associated with an idle processing tool. The controller may then remove one or more active sensors from the active sensor list, e.g. to increase the available bandwidth for other sensors, such as sensors that may be useful to detect and/or classify a fault or other unexpected event. Alternatively, the controller may add one or more sensors to the active sensor list in response to determining that additional network bandwidth is available. In one embodiment, the active sensor list is modified (at 450) using empirical correlations between the work-in-progress levels, process states, and the available bandwidth.

The controller then provides (at 460) the modified data collection plan to one or more of the sensors. In one embodiment, the controller provides (at 460) the modified data collection plan during a process run. In another embodiment, the controller provides (at 460) the modified data collection plan between two process runs.

By implementing one or more embodiments of the present invention, the present invention may improve the efficiency with which bandwidth is allocated to the various sensors and/or processing tools in an APC system. For example, sensors associated with idle processing tools may be deactivated so that they do not collect data, or the data collected by these sensors may not be stored and/or transmitted over the network, thereby reducing the allocated network bandwidth. Furthermore, the ability of the APC system to detect and/or classify faults or other unexpected events associated with the processing tools may be enhanced. For example, the APC system may be able to increase the number of active sensors available to collect and provide tool trace data relevant to the suspected fault or unexpected event.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
providing an active sensor list indicative of at least one sensor associated with at least one processing tool, the at least one sensor being communicatively coupled to a network having an associated bandwidth;
receiving information indicative of a state of at least one of the processing tools; and
modifying the active sensor list based on the information indicative of the state of the at least one of the processing tools and the associated network bandwidth.

2. The method of claim 1, wherein modifying the active sensor list comprises adding at least one sensor to the active sensor list.

3. The method of claim 2, wherein adding at least one sensor to the active sensor list comprises adding the at least one sensor to the active sensor list in response to determining that additional network bandwidth is available based on the information indicative of the state of the at least one of the processing tools.

4. The method of claim 3, wherein adding the at least one sensor to the active sensor list in response to determining that additional network bandwidth is available based on the information indicative of the state of the at least one of the processing tools comprises adding the at least one sensor to the active sensor list in response to determining that at least one processing tool is idle.

5. The method of claim 1, wherein modifying the active sensor list comprises removing at least one sensor from the active sensor list.

6. The method of claim 5, wherein removing the at least one sensor from the active sensor list comprises removing the at least one sensor from the active sensor list to increase available network bandwidth.

7. The method of claim 1, wherein modifying the active sensor list comprises modifying the active sensor list based upon at least one of a sensor preference and a sensor priority.

8. The method of claim 1, wherein modifying the active sensor list comprises determining that a value associated with tool trace data provided by at least one of the sensors is different than an expected value.

9. The method of claim 1, wherein modifying the active sensor list comprises modifying the active sensor list based upon at least one empirical correlation between at least one work-in-progress levels, at least one process state, and the bandwidth.

10. The method of claim 1, further comprising providing the modified active sensor list.

11. The method of claim 10, wherein providing the modified active sensor list comprises providing the modified active sensor list during a process run.

12. The method of claim 10, wherein providing the modified active sensor list comprises providing the modified active sensor list between two process runs.

13. The method of claim 1, further comprising determining the bandwidth associated with the network.

14. The method of claim 13, wherein determining the bandwidth associated with the network comprises determining the bandwidth associated with the network based on at least one of a predetermined bandwidth, the active sensor list, and the information indicative of the state of the at least one of the processing tools.

15. A manufacturing system, comprising:
means for providing an active sensor list indicative of at least one sensor associated with at least one processing tool, the at least one sensor being communicatively coupled to a network having an associated bandwidth;
means for receiving information indicative of a state of at least one of the processing tools; and
means for modifying the active sensor list based on the information indicative of the state of the at least one of the processing tools and the associated network bandwidth.

16. A manufacturing system, comprising:
a network having an associated bandwidth;
at least one sensor communicatively coupled to the network, the sensor configured to provide tool trace data associated with a processing tool via the network;
a controller configured to:
provide an active sensor list indicative of at least one of the sensors coupled to the network;
receive information indicative of a state of at least one of the processing tools; and
modify the active sensor list based on the information indicative of the state of the at least one of the processing tools and the associated network bandwidth.

17. The system of claim 16, wherein the controller is configured to add at least one sensor to the active sensor list.

18. The system of claim 17, wherein the controller is configured to add the at least one sensor to the active sensor list in response to determining that additional network bandwidth is available based on the information indicative of the state of the at least one of the processing tools.

19. The system of claim 18, wherein the controller is configured to add the at least one sensor to the active sensor list in response to determining that at least one processing tool is idle based on the information indicative of the state of the at least one of the processing tools.

20. The system of claim 16, wherein the controller is configured to remove at least one sensor from the active sensor list.

21. The system of claim 20, wherein the controller is configured to remove the at least one sensor from the active sensor list to increase available network bandwidth.

22. The system of claim 16, wherein the controller is configured to modify the active sensor list based upon at least one of a sensor preference and a sensor priority.

23. The system of claim 16, wherein the controller is configured to determine that a value associated with the tool trace data is different than an expected value.

24. The system of claim 16, wherein the controller is configured to modify the active sensor list based upon at least one empirical correlation between at least one work-in-progress levels, at least one process state, and the bandwidth.

25. The system of claim 16, wherein the controller is configured to provide the modified active sensor list.

26. The system of claim 25, wherein the controller is configured to provide the modified active sensor list during a process run.

27. The system of claim 25, wherein the controller is configured to provide the modified active sensor list between two process runs.

28. The system of claim 16, wherein the controller is configured to determine the bandwidth associated with the network.

29. The system of claim 28, wherein the controller is configured to determine the bandwidth associated with the network based on at least one of a predetermined bandwidth, the active sensor list, and the information indicative of the state of the at least one of the processing tools.

30. A method, comprising:
providing an active sensor list indicative of at least one sensor associated with at least one processing tool, the at least one sensor being communicatively coupled to a network having an associated bandwidth;
receiving information indicative of a state of at least one of the processing tools;
removing at least one sensor from the active sensor list based on the information indicative of the state of the at least one of the processing tools and the associated network bandwidth; and
adding at least one sensor to the active sensor list based on the information indicative of the state of the at least one of the processing tools and the associated network bandwidth.

* * * * *